UNITED STATES PATENT OFFICE.

RAY HILL WHITE, OF NIAGARA FALLS, NEW YORK, ASSIGNOR TO NORTON COMPANY, OF WORCESTER, MASSACHUSETTS, A CORPORATION OF MASSACHUSETTS.

PRODUCING CRYSTALLINE ALUMINA.

1,269,141.   Specification of Letters Patent.   Patented June 11, 1918.

No Drawing.   Application filed August 18, 1917.   Serial No. 186,927.

*To all whom it may concern:*

Be it known that I, RAY HILL WHITE, a citizen of the United States, residing at Niagara Falls, in the county of Niagara and State of New York, have invented certain new and useful Improvements in Producing Crystalline Alumina, of which the following is a specification.

This invention is a novel method whereby increased yields of crystalline alumina are obtainable in the standard electric furnaces such as are used for the production of aluminous abrasives and refractories.

Such furnaces are provided with a carbon hearth, and in their operation a certain amount of reduction of alumina is found to take place in the layer of the charge adjacent this hearth. On this account it has heretofore been customary to reject the lower portion or stratum of the alumina pig on account of the presence therein of reduction products of alumina. These reduction products, including aluminum carbid and perhaps also a suboxid of aluminum, not only impart a dark color to the portion of the product in which they occur, but give rise in presence of moisture to a slow evolution of gas with progressive disintegration of the material. The formation of these reduction products is especially pronounced in the fusion of substantially pure alumina, inasmuch as the protective effect of such more readily reducible oxids as those of iron and silicon is lacking in this case.

According to the present invention this difficulty is overcome, and an increased yield of merchantable crystalline alumina is obtained, by fusing a non-uniform furnace charge, whereof the portion lying in the zone in which reduction is liable to occur, that is, adjacent the carbon hearth, contains a sufficient proportion of a suitable oxidizing agent, herein referred to as an oxidizing addition.

As such oxidizing addition I may employ any reducible metallic oxid or salt which will serve to protect the alumina from the reducing action of the carbon hearth, while at the same time yielding a reduced product—metal or alloy—which is easily separable from the alumina pig. Iron oxid will serve this purpose. However, in order to avoid the necessity for a special operation for the removal of iron from the product, and also to allow somewhat more latitude in the proportion of the oxidizing addition, I prefer to employ substances of which the reduction products are volatile under the furnacing conditions. Typical examples of such products are zinc oxid, and the oxygen-compounds of the alkali metals, for example soda-ash.

The amount of such oxidizing additions required to prevent reduction of the lower portion of the pig is relatively small, amounting in most cases to not more than five per cent. by weight of the portion of the charge to which they are added. This portion comprises a few inches overlying the carbon hearth of the furnace.

It is a marked advantage of the use in this relation of oxidizing additions yielding volatile reduction products that they may be employed in considerable excess of the proportion actually necessary to avoid reduction of alumina, thereby assuring complete protection of the alumina even under abnormally intense or prolonged fusion.

I claim:—

1. In the art of fusing alumina in carbon-hearth furnaces, the method which consists in electrically fusing a non-uniform charge whereof the lower portion contains an oxidizing addition, whereby reduction of alumina by the carbon hearth is prevented.

2. In the art of fusing alumina in carbon-hearth furnaces, the method which consists in electrically fusing a non-uniform charge whereof the lower portion contains an oxidizing addition yielding volatile reduction products, whereby reduction of alumina by the carbon hearth is prevented.

In testimony whereof, I affix my signature.

RAY HILL WHITE.